United States Patent
Scholze

(10) Patent No.: US 7,502,524 B2
(45) Date of Patent: Mar. 10, 2009

(54) METHOD AND APPARATUS OF PROCESSING A SKIN PRINT IMAGE

(75) Inventor: Steffen Scholze, Hamburg (DE)

(73) Assignee: NXP B.V., Eindhoven (NL)

( * ) Notice: Subject to any disclaimer, the term of this patent is extended or adjusted under 35 U.S.C. 154(b) by 797 days.

(21) Appl. No.: 10/525,812

(22) PCT Filed: Aug. 20, 2003

(86) PCT No.: PCT/IB03/03695

§ 371 (c)(1),
(2), (4) Date: Feb. 25, 2005

(87) PCT Pub. No.: WO2004/021262

PCT Pub. Date: Mar. 11, 2004

(65) Prior Publication Data

US 2005/0232472 A1  Oct. 20, 2005

(30) Foreign Application Priority Data

Aug. 28, 2002  (DE)  ............... 102 39 343

(51) Int. Cl.
*G06K 9/00* (2006.01)
*G06K 9/40* (2006.01)

(52) U.S. Cl. ............... 382/263; 382/124; 382/266

(58) Field of Classification Search ......... 382/124–127, 382/199, 254, 260, 263, 266, 279
See application file for complete search history.

(56) References Cited

U.S. PATENT DOCUMENTS

| 4,745,550 A | * | 5/1988 | Witkin et al. ............... 702/11 |
| 5,365,429 A | * | 11/1994 | Carman ............... 378/37 |
| 5,694,487 A | * | 12/1997 | Lee ............... 382/201 |
| 5,717,786 A | * | 2/1998 | Kamei ............... 382/204 |

OTHER PUBLICATIONS

Jain A K et al: "An Identity-Authentication System Using Fingerprints" Proceedings of the IEEE, IEEE. New York, US, vol. 85, No. 9 Sep. 1, 1997.

* cited by examiner

*Primary Examiner*—Colin M Larose

(57) ABSTRACT

In a method and an arrangement for processing a skin print image, and particularly a fingerprint image, which image exists as a gray-level image, provision is made for the gray-level image to be convolved in the direction of two axes (x, y) by generalized gradient filters (Gx, Gy), for the generalized gradients (Bx, By) obtained in this way to be normalized, for the normalized, generalized gradients (Cx, Cy) each to be convolved with generalized gradient filters (Qx, Qy), and for the sum (D) of the two results (Dx, Dy) of the convolution of the normalized, generalized gradients (Cx, Cy) to be converted to binary form.

3 Claims, 2 Drawing Sheets

METHOD AND APPARATUS OF PROCESSING A SKIN PRINT IMAGE

The invention relates to a method of processing a skin print image, and particularly a fingerprint image, which image exists as a gray-level image. The invention further relates to an arrangement for processing a skin print image of this kind.

When an image is made of a print from the skin, and particularly a fingerprint image is made, what is obtained is data that represents an image in the form of a number, of greater or lesser magnitude, of gray-levels. For a subsequent analysis of the image of the fingerprint aimed at comparing images that have currently been made with stored ones, it is necessary for relevant features to be extracted. These include, for example, the position and number of branchings and endings of ridges (minutiae). It is generally necessary for a binary image to be produced for processing of this kind, i.e. an image whose brightness values may assume only two states, e.g. black lines on a white background.

It is an object of the present invention to specify a method of processing a skin print image, which image exists in the form of a gray-level image. It is also an object of the present invention to specify an arrangement for processing an image of this kind of a print from the skin.

This object is achieved in accordance with the invention by a method by which the gray-level image is convolved in the direction of two axes (x, y) by generalized gradient filters (Gx, Gy), the generalized gradients (Bx, By) obtained in this way are normalized, the normalized, generalized gradients (Cx, Cy) are each convolved with generalized gradient filters (Qx, Qy) and the sum (D) of the two results (Dx, Dy) of the convolution of the normalized, generalized gradients (Cx, Cy) is converted to binary form.

The object is also achieved in accordance with the invention by an arrangement that is provided with means for performing the designated signal-processing steps by the method according to the invention. These means may in particular take the form of means for digital signal processing.

A particular provision that is made in the case of the invention is that the generalized gradient filters (Gx, Gy, Qx, Qy) each constitute the superimposition of a two-dimensional Gaussian bell curve and a suitably enlarged gradient filter, the size of each of which is adjusted to suit the average density of the furrows in the skin print image.

To enable relevant features of the skin print image to be extracted, it is also necessary for only those parts of the image to be processed that are situated within the region of interest (ROI). To determine these, provision may be made in the method according to the invention for items (L) of length information to be obtained from the generalized gradients (Bx, By), which items (L) of length information are compared with a preset length and, if the preset length is exceeded, the given pixel is designated as belonging to the region of interest.

The method according to the invention can be implemented, in a manner that is particularly efficient in terms of computing time, RAM space required and program memory space required, as a program.

By means of the invention, irregularities in the original image, such as tears, pores, scars, creases, differences in intensity caused by dryness or moisture and/or dirt, can be corrected without any complicated and expensive filtering, such as filtering by Gabor filters and fast Fourier transforms, for example. Also, the method can easily be adapted to different sensors because the number of parameters used is only relatively small. The region of interest is calculated from intermediate results with only a low computing burden.

These and other aspects of the invention are apparent from and will be elucidated with reference to the embodiments described hereinafter.

Figure 1A:
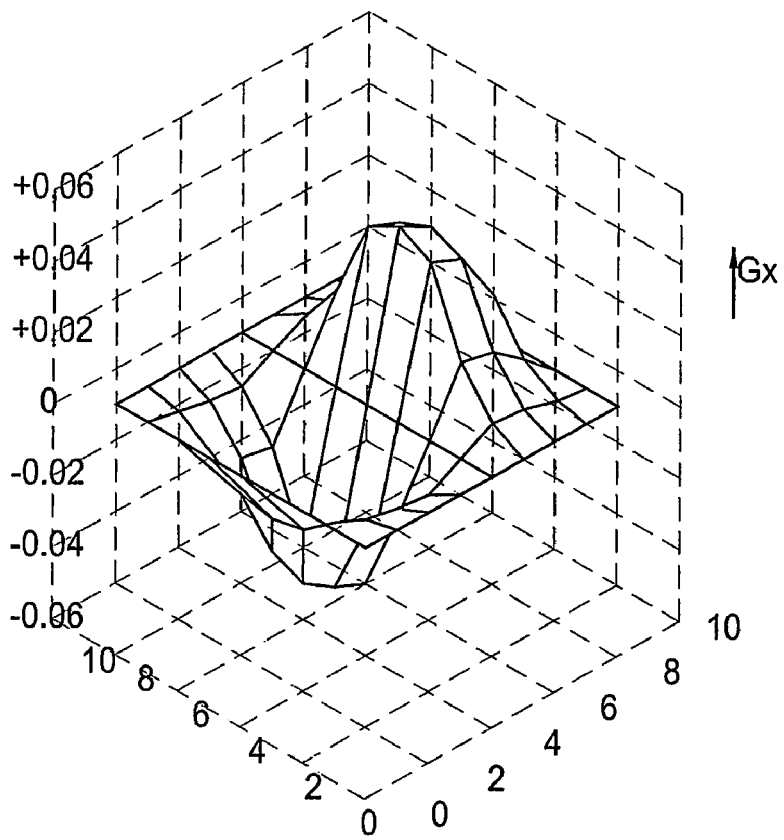
FIG. 1 shows examples of generalized gradient filters.
Figure 1B:
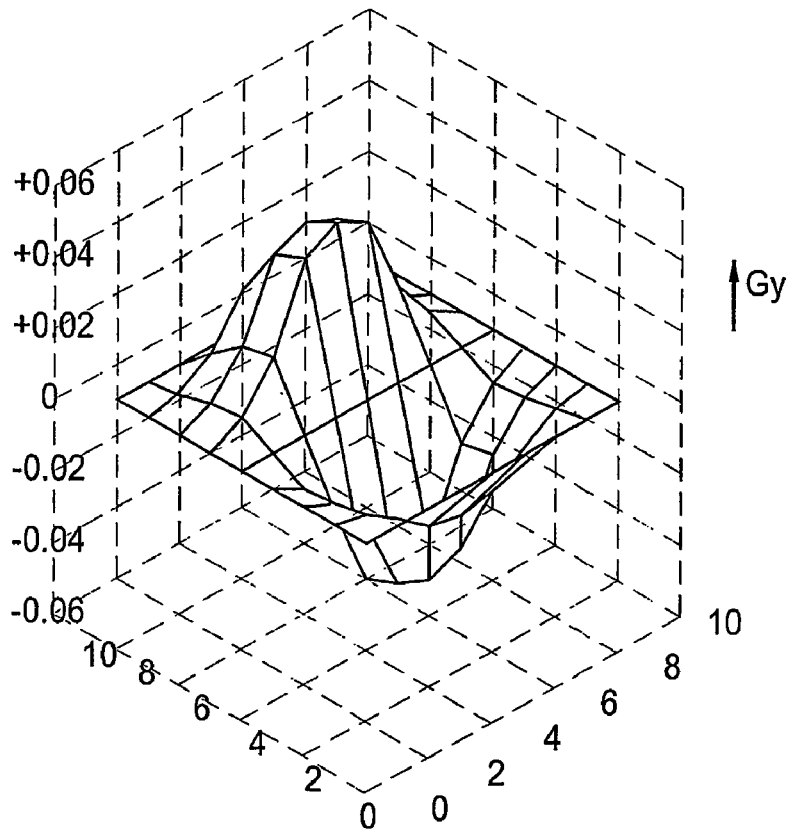
Figure 2:
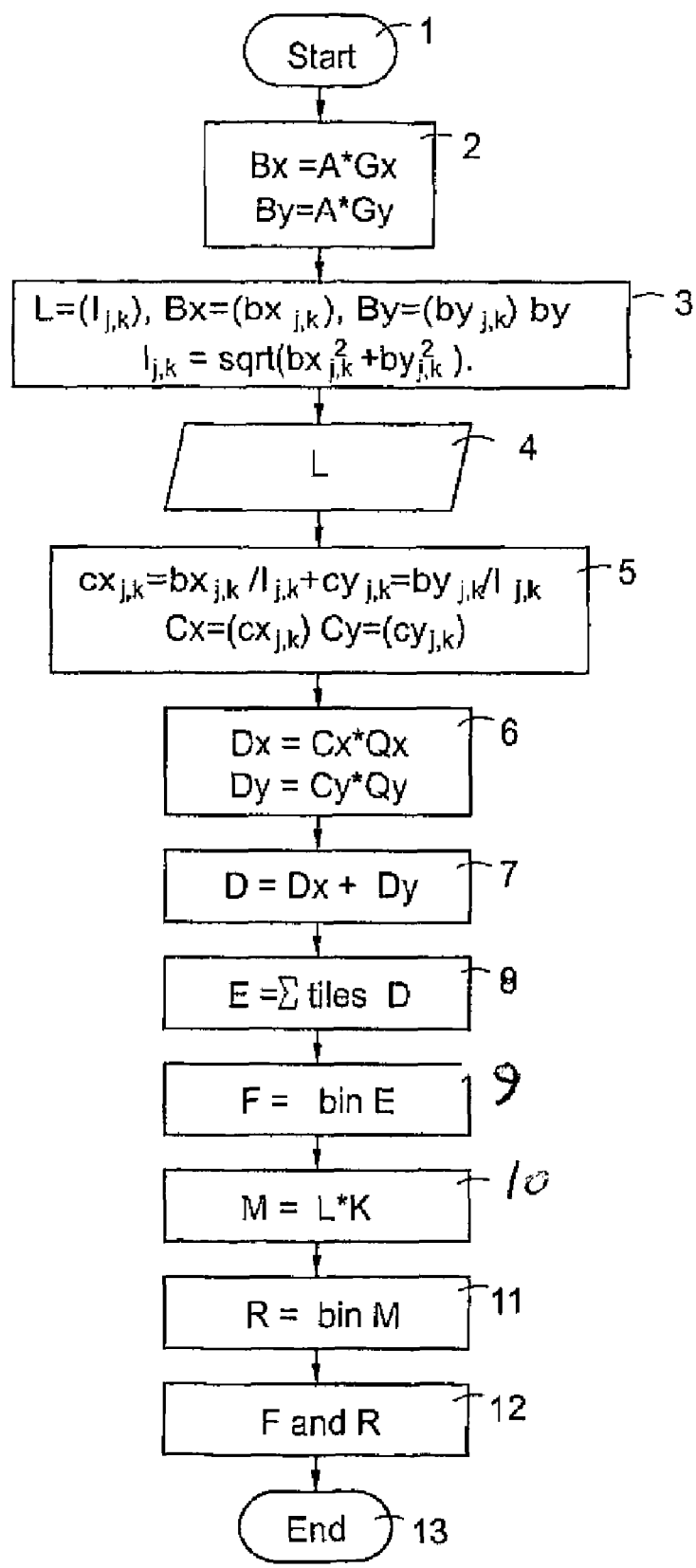
FIG. 2 is a flow chart of an embodiment of a computer program for performing the method according to the invention.

FIG. 1 is a diagrammatic representation of an example of the generalized gradient filters Gx (FIG. 1a) and Gy (FIG. 1b) of 7×7 pixel size. In contrast to normal gradient filters (which are, for example, −1, 0, +1 for the x axis), the sign is inverted for one half following a Gaussian bell curve that is symmetrical in rotation. The size of the filter Gx needs to be selected in this case to suit the resolution of the image or the average spacing of the furrows in the fingerprint. When rotated through 90° in a counterclockwise direction, this gives the generalized gradient filter Gy in the y direction In the flow chart shown in FIG. 2, the program starts at 1 and following this the convolutions Bx=A*Gx and By =A*Gy are made in step 2. The convolutions produce the values Bx and By for all the pixels. Then, at 3, the lengths of the generalized gradients Bx and By are calculated for each of the pixels. The length values are buffered at 4.

In step 5 of the program, the generalized gradients are normalized, likewise pixel by pixel, to give results Cx and Cy.

The normalized, generalized gradients Cx and Cy are then convolved at 6 with generalized gradient filters Qx and Qy to give gradients Dx and Dy.

At 7, the gradients Dx and Dy are added together pixel by pixel. D=(dk,1) is then divided into overlapping, square tiles of equal size, with each dk,1 being situated in exactly the same number e of tiles. Each tile is converted into binary form individually by taking the mean of all the gray levels occurring in the tile as a threshold value b for the conversion of this tile into binary form. All dk,1s>b are set to 1 and all dk,1s<b are set to 0. The tiles that have been converted into binary form in this way are added together in line with their position, thus giving, at 8, a gray-level image B having a maximum of e+1 different gray levels. This gray-level image is converted into binary form as a whole in step 9 of the program, using a suitable threshold c, to give an image F.

At 10, the stored lengths L are convolved in two dimensions following a Gaussian bell curve to give a result M. This latter is assessed at 11 as a globally binarized version R of M. At 12, the image E and the image R are combined to give a resulting image H, whereupon the program is terminated at 13.

The invention claimed is:

1. A method of processing a skin print image, and particularly a fingerprint image, which image exists as a gray-level image, comprising a processor for performing the steps of: convolving the gray-level image in the direction of two axes (x, y) by generalized gradient filters, wherein the generalized radiant filters each constitute the superimposition of a two-dimensional Gaussian bell curve and a suitably enlarged radiant filter, the size of each of which is adjusted to suit the average density of the furrows in the skin print image; normalizing the generalized gradients, convolving each of the normalized, generalized gradients with said generalized gradient filters, summing results of the convolution of the normalized, generalized gradients; and converting the results of the convoluted, normalized, generalized gradients to binary form.

2. A method as claimed in claim 1, to enable a region of interest of a skin print image to be determined from the generalized gradients, items of length information are obtained that are compared with a preset length and, if the preset length is exceeded, a corresponding pixel is designated as belonging to the region of interest.

3. An arrangement for processing a skin print image, and particularly a fingerprint image, which image exists as a gray-level image, comprising: a signal processing means in communication with a memory containing a program, which when accessed by the signal processing means causing the signal processing means to execute:

convolving the gray-level image in the direction of two axes (x, y) by generalized gradient filters to obtain generalized gradients, wherein the generalized gradient filters each constitute the superimposition of a two-dimensional Gaussian bell curve and a suitably enlarged gradient filter, the size of each of which is adjusted to suit the average density of the furrows in the skin print image;

normalizing the generalized gradients, convolving each of the normalized, generalized gradients with said generalized gradient filter, converting the sum of the two results of the convolution of the normalized, generalized gradients to binary form;

obtaining items of length information from the generalized gradients, for comparing these item of length information with a preset length and, if the preset length is exceeded, designating a corresponding pixel as beloning to a re ion of interest.

\* \* \* \* \*